Patented Apr. 6, 1954

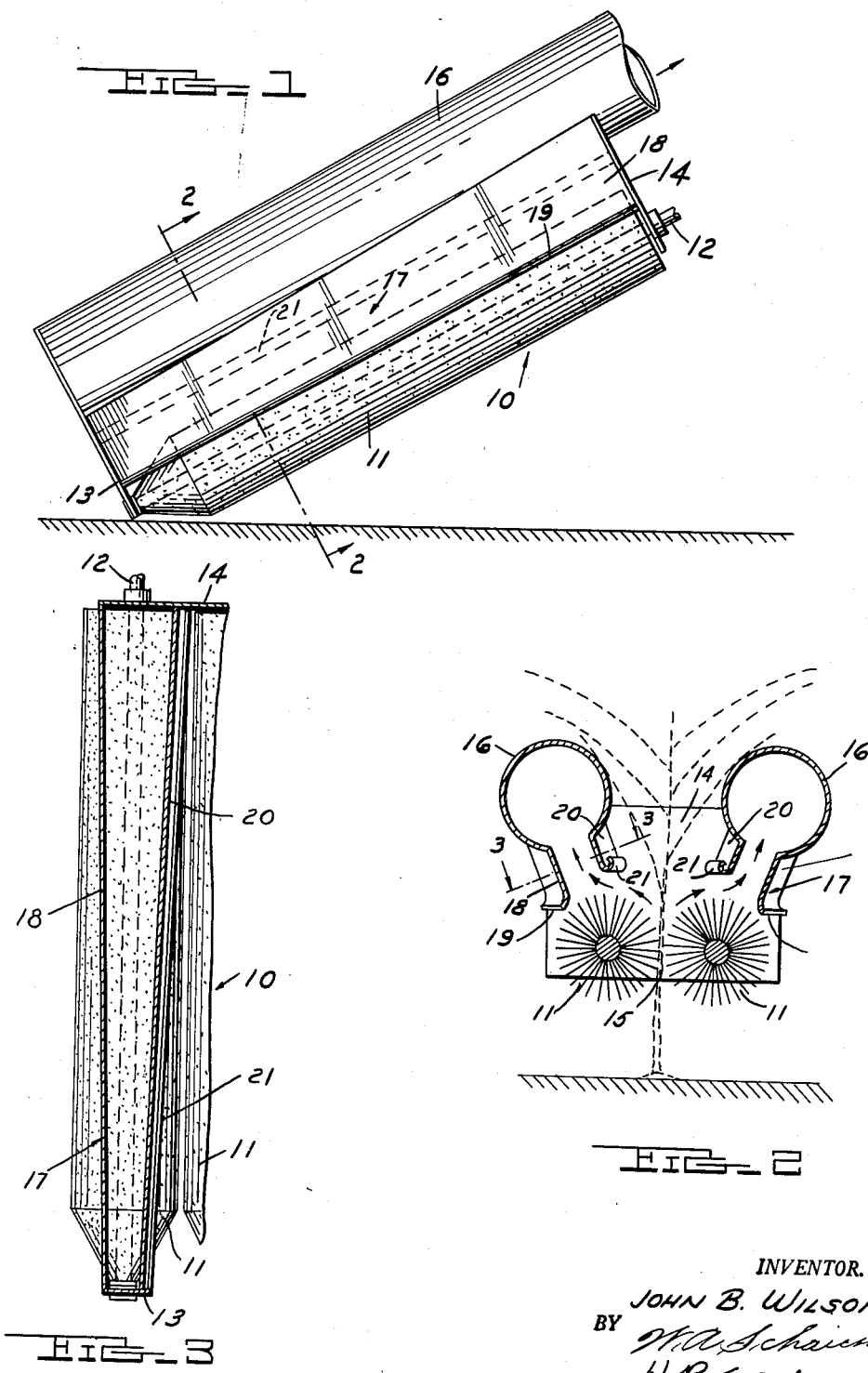

2,674,080

UNITED STATES PATENT OFFICE 2,674,080

COTTON STRIPPER

John B. Wilson, Auburn, Ala., assignor, by mesne assignments, to Ford Motor Company, Dearborn, Mich., a corporation of Delaware Application April 7, 1952, Serial No. 280,906

7 Claims. (Cl. 56—30)

The present invention relates to a crop stripping means for a harvesting machine and more particularly to a crop stripping element and pneumatic take off assembly for a stripper-type harvesting machine.

In the harvesting of cotton and similar crops, it has been proposed that the crop be removed from the associated plant by a pair of counterrotatable crop stripping elements cooperably defining therebetween a stripping nip at which the crop is removed from the plant by the action of the elements. In the case of cotton and similar low density crops, the relatively light air-floatable material including the cotton may be removed by aspirating the cotton from the plant, as in a suction air stream. In the pending applications of Robert H. Witt, Serial Numbers 240,565 now abandoned and 240,566, filed August 6, 1951, and assigned to the assignee of the present invention, one form of such a pneumatic pickup is disclosed.

The present invention now provides an improved pneumatic pickup and crop conveying system which is effective to remove the crop from the stripping elements, which preferably take the form of bristle brushes. In addition, the conduits utilized for conveying the crop serve as plant compressors effective to fold or compress the plants, upon themselves prior to subjection of the plant to the stripping nip. In this manner, conduits serve to prevent the draping of the plant over the brushes and the stripping of limbs, bark, etc., from the limbs is prevented, as well as accurately center the plants between the brushes.

Thus, the pickup preferably takes the form of a pair of laterally spaced intake conduits extending longitudinally of the stripping elements and each directly overlying and substantially coextensive with the associated element. As the harvesting machine progresses through the crop, each individual plant is interposed between the brushes and also between the conveying conduits. The portions of the plant to be stripped must first pass between the conduits and then through the brush nip, so that the plants are compressed and then stripped. The conveyor intake ports directly overlie the associated brushes, so that those portions of the crop upon the brush peripheries are subjected to the vacuum or reduced pressure conditions existing within the conduits which are vented to the intake side of the crop conveying fan or the like. The crop is thrown from the brushes by the centrifugal forces generated upon brush rotation and is air-floated from the brushes by the aspirating effect of the suction intake conduits, so that the crop is effectively removed from the brushes along substantially the entire length of the brushes to prevent the bunching or agglomeration of the crop.

It is, therefore, an important object of the present invention to provide an improved stripper-type harvesting machine wherein the crop is removed from a pair of rotating stripping elements through a pair of intake nozzles immediately adjacent and substantially coextensive with the elements.

Another important object of the present invention is to provide a crop stripping machine wherein the crop on the stripping elements is subjected to the combined centrifugal action of the rotating stripping elements and to the suction of an intake conduit positioned immediately adjacent the brush and effective along substantially the entire length thereof.

It is a further important object of the present invention to provide a crop stripping machine including a pair of counterrotatable stripping brushes and an aspirating conduit overlying each of the brushes, the conduits defining a compressing nip immediately adjacent to the stripping nip of the brushes and having elongated intake ports located immediately adjacent to the peripheries of the brushes.

Still another object is the provision of a crop stripping machine including a pair of laterally juxtapositioned stripping brushes defining a stripping nip therebetween and a pair of similarly juxtapositioned intake conduits defining a nip therebetween vertically aligned with the stripping nip, the conduits having intake ports interposed between the nips and effective to remove a stripped air-floatable crop from the brushes due to the combined centrifugal flinging of the crop upon brush rotation and the air-floating of the crop due to the aspirating effect exerted by the intake nozzles.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of the harvesting head of a stripper-type harvesting machine provided with stripping means of the present invention;

Figure 2 is a sectional view on a reduced scale taken along the plane 2—2 of Figure 1; and Figure 3 is a sectional view of the device taken along the plane 3—3 of Figure 2.

As shown on the drawings:

In Figure 1 reference numeral 10 refers generally to a harvesting head of a crop stripping machine particularly adapted for the harvesting of cotton or similar air-floatable crops. The harvesting head is designed for employment with a crop stripping machine generally similar to that disclosed in detail in the above identified applications of Robert H. Witt.

The harvesting head includes generally a pair of upwardly and rearwardly inclined bristle-type stripping brushes 11, the spindles 12 of which are journaled in generally parallel front and rear walls 13 and 14, respectively. The spindles 12 are adapted to be rotatably driven by suitable means, as by the harvester prime mover. It is to be noted that the brushes 11 are generally parallel and extend upwardly and rearwardly so as to define therebetween an inclined stripping nip 15. Overlying each of the brushes 11 to extending generally parallel thereto and in closely spaced lateral relation are a pair of generally cylindrical suction intake conduits 16. The conduits are adapted for connection to the intake sides of a pneumatic blower, such as this disclosed in the Witt applications and serving at its discharge side to convey the harvested material to a suitable receptacle.

Each of the conduits 16 is provided on its undersurface with an intake nozzle indicated generally at 17 and extending longitudinally throughout substantially the entire length of the associated brush 11. The nozzles 17 are rearwardly and outwardly tapered as best shown in Figure 3, the nozzles being of smaller cross-section at the forward ends thereof, so that a substantially uniform pressure drop along the length thereof is obtained.

More particularly, the pipes 16 are each provided with depending integral flanges 18 on the outboard side of the brushes, the outer plates 18 terminating in closely spaced relation to the periphery of the associated brush 11 in an outturned lip 19. The inboard side of each nozzle 17 is defined by an integral flange 20 defining an inner nozzle plate terminating in a backturned lip 21 in spaced relation to the corresponding portion of the periphery of the associated brush. The spacing of the lip 21 from the brush is sufficient to accommodate the passage thereunder of the harvested crop, and this space is also sufficient to allow the passage of those portions of the crop being flung centrifugally from the brushes due to rotation of the brush. The outboard lip 18 provides a baffle plate surface against which a centrifugally flung portion of the crop may rebound into the interior of the conduit 16, while the lip 19 is closely spaced from the roll 11 to define a cutoff surface beyond which the crop cannot travel.

Since the harvested and desired crop, such as cotton, is of a lower density than the undesired materials, such as green bolls and other trash, the desired crop will be flung from the brushes when subject to a centrifugal force less than that necessary to similarly fling the heavier material therefrom, particularly since the centrifugal force is effective only at the top of the brushes where the weight of the heavier material will tend to retain the same on the brush. Further, the resilient bristles of the brush will readily deflect to accommodate the passage of the undesired material beyond the lip 19. In addition, the harvested crop is subjected not only to centrifugal force but also to the aspirating force of the vacuum within the intake conduits 16. The harvested crop will be air-floated within this air stream, while the relatively heavier trash material will not be so air-floated. Consequently, an effective density separation of the cotton from the undesired heavier materials is obtained at the juncture of the nozzles 17 and the brushes 11.

It will also be noted that the conduits 16 are laterally spaced to define therebetween a relatively broad nip in vertically spaced relation and in alignment with the stripping nip 15. As the harvesting machine 10 advances through the crop, the brushes 11, by virtue of their inclination, travel upwardly along the stalk of each individual plant to effectively strip the crop therefrom. To condition the plant for entry into the stripping nip 15, it is desirable to fold the plant branches inwardly upon themselves to prevent draping of the branches over the brushes. In the event of such draping the crop may be prematurely stripped by the brushes so that the crop may fall upon the ground and the branches may be stripped of bark, etc. The relatively broad nip defined by the conduit 16 accomplishes this compression of the plant as best illustrated in Figure 2.

As hereinbefore explained, the present invention provides an improved crop stripping means including a pair of counterrotatable stripping brushes and suction intake conduits overlying the brushes and having intake nozzles immediately adjacent the brush periphery. The cotton or other harvested plant is centrifugally flung into the nozzles and is also subject to the aspirating effect exerted at the nozzles. Further, the conduits serve to compress the plant prior to its subjection to a stripping action of the brushes, and an effective density separation of the harvested air-floatable crop from the heavier trash and the like is also effected by the stripping means of the present invention. Also, the suction nozzles are coextensive with the brushes, so that the crop is removed from the brushes and introduced into the conveying conduits along the entire length of the brushes. Since the cotton need not be collected before introduction into the conveying system, the possibilities of bunching of the cotton and/or plugging of the nozzles by a collected wad of cotton are reduced to a minimum. In addition, the brushes are kept clean of cotton, trash, etc., by the aspirating effect exerted along the entire length of the brushes.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a cotton harvester, a pair of counterrotatable stripping brushes defining a restricted stripping nip therebetween, a pair of suction conduits generally overlying said brushes, respectively, and coextensive with said brushes to define a compressing nip vertically aligned with said stripping nip, and intake nozzles communicating with said conduits and extending along substantially the entire length of said brushes, said nozzles being interposed between said nips and opening toward said brushes to receive a stripped crop therefrom and to subject the exterior surfaces of said brushes to the reduced pressure conditions of said conduits.

2. In a harvester, a pair of counterrotatable stripping elements defining a restricted stripping nip therebetween at which a crop is stripped from an associated plant, a suction conduit positioned adjacent to said elements, and an elongated intake nozzle in full communication with said conduit and substantially coextensive with said elements, said nozzle being interposed in the path of travel of the harvested crop as the same is flung from the rotatable stripping elements to conduct the crop to said conduit and also being effective to exert the reduced pressures of said conduit upon the crop.

3. In a harvesting machine having a pair of elongated relatively rotatable stripping elements defining therebetween a crop stripping nip at which a crop is stripped from the associated plant, the improvements which comprise a suction conduit positioned adjacent said elements, and means on said conduit defining an intake nozzle substantially coextensive with said elements and having an intake port placed in juxtaposition thereto, the cross-sectional area of said port diminishing along the length of said nozzle to insure a substantially constant pressure drop therealong.

4. In a harvesting machine having a pair of elongated counterrotatable stripping elements defining therebetween a crop stripping nip at which a crop is stripped from the associated plant, the improvements which comprise a suction conduit overlying each of said elements and disposed on opposite sides of said nip, respectively, and means on each of said conduits defining an intake nozzle therefor, said nozzles being substantially coextensive with said elements and lying in the path of centrifugal travel of said crop as the same is flung from the rotatable elements.

5. In a harvesting machine having a pair of elongated counterrotatable stripping elements defining therebetween a crop stripping nip at which a crop is stripped from the associated plant, the improvements which comprise a suction conduit overlying each of said elements and disposed on opposite sides of said nip, respectively, and means on each of said conduits defining an intake nozzle therefor, said nozzles being substantially coextensive with said elements and lying in the path of centrifugal travel of said crop as the same is flung from the rotatable elements, said means including an inner nozzle plate overlying each element adjacent the nip and spaced from the associated element to accommodate the passage of the crop therebeneath into the nozzle and an outer plate peripherally spaced further from said nip than said inner plate and extending into close proximity to the associated element to define a cut-off surface beyond which the crop cannot travel.

6. In a harvesting machine having a pair of elongated counterrotatable stripping elements defining therebetween a crop stripping nip at which a crop is stripped from the associated plant, the improvements which comprise a suction conduit overlying each of said elements, respectively, and disposed on opposite sides of said nip, and a pair of laterally spaced depending plates on each of said conduits extending therefrom into spaced relation to said elements for defining an intake nozzle communicating with said conduits and spaced peripherally of said elements, respectively, from said nip, said nozzle receiving the crop from said elements by virtue of the centrifugal flinging of said crop therefrom and the reduced pressure vented to said element by said nozzle.

7. In a cotton harvesting machine, a pair of counterrotatable stripping brushes having resilient circumferential bristles cooperably defining a stripping nip between the brushes, and a suction conduit overlying each of said brushes, respectively, and each having downturned spaced lips defining an intake port extending longitudinally of the associated brush, the inner lip of each conduit being spaced from the circumference of the associated brush for accommodating the passage of cotton therebeneath for entry into said port and air-flotation into said conduit, the outer lip of each conduit extending into close proximity to the associated brush to prevent the passage of cotton therebeyond, while the resiliency of the brush bristles accommodates the passage of non-air-floatable trash and the like beyond said outer lip.

References Cited in the file of this patent

UNITED STATES PATENTS

| Number | Name | Date |
|---|---|---|
| 1,722,747 | Hentz | July 30, 1929 |
| 2,471,842 | Spell | May 31, 1949 |
| 2,538,454 | Hart, Jr. | Jan. 16, 1951 |